Dec. 19, 1950 P. S. ALLEN 2,534,214
CAMERA SHUTTER AND FILM ACTUATING MECHANISM
Filed June 20, 1947 3 Sheets-Sheet 1
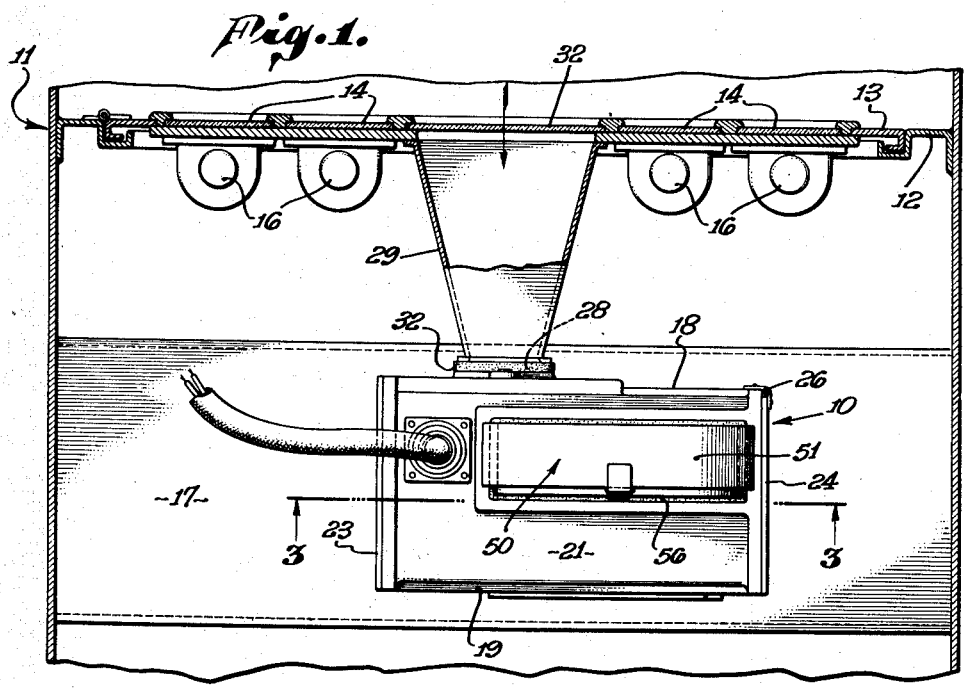
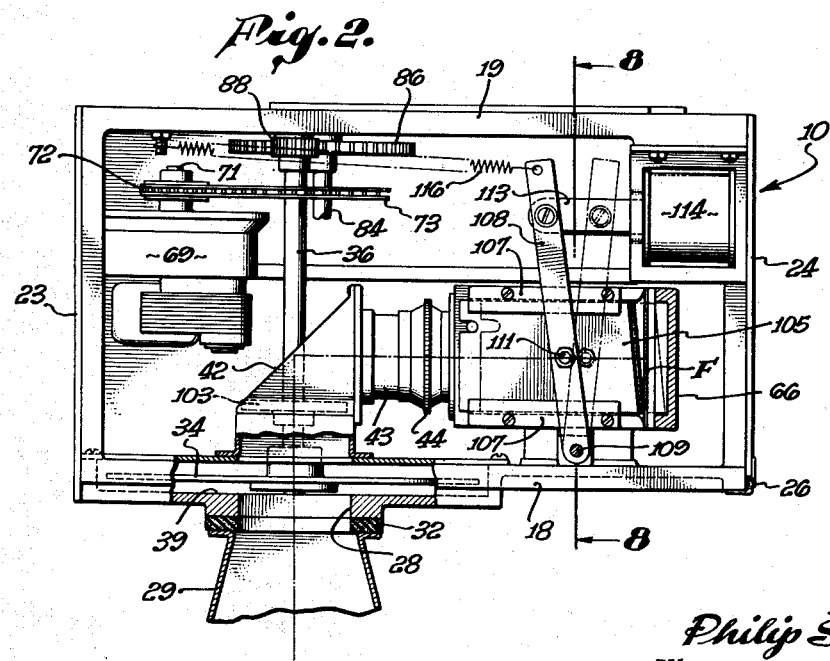
INVENTOR.
Philip S. Allen
BY
ATTORNEY Dec. 19, 1950 P. S. ALLEN 2,534,214
CAMERA SHUTTER AND FILM ACTUATING MECHANISM
Filed June 20, 1947 3 Sheets-Sheet 2
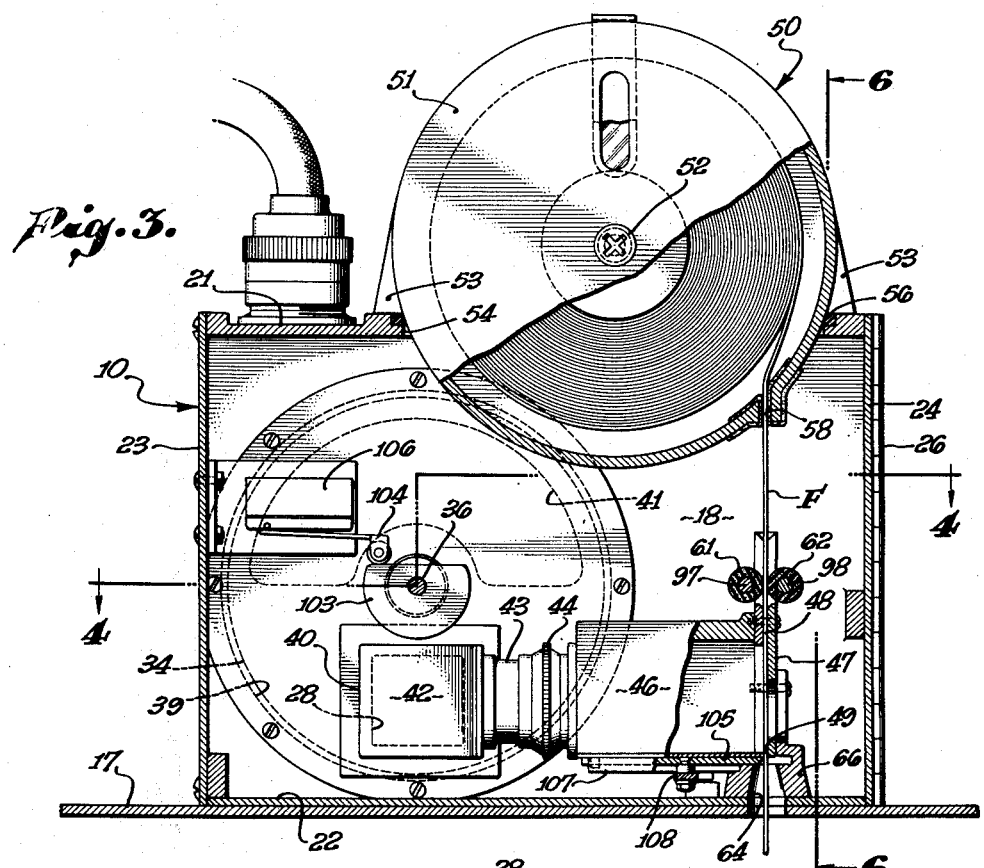
Fig. 3.
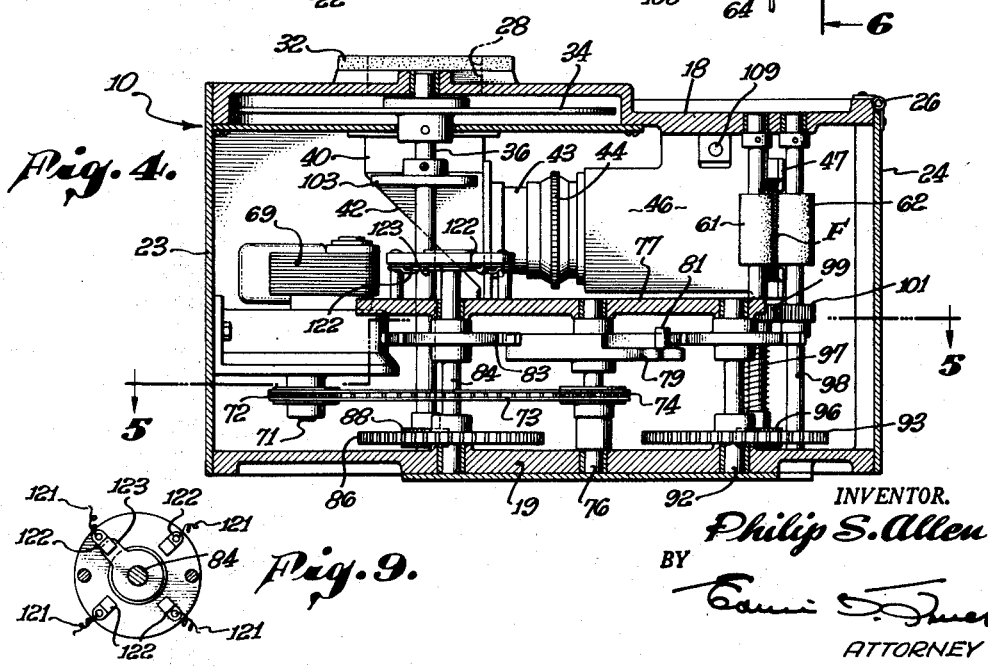
Fig. 4.
Fig. 9.
INVENTOR.
Philip S. Allen
BY
ATTORNEY Dec. 19, 1950        P. S. ALLEN        2,534,214
CAMERA SHUTTER AND FILM ACTUATING MECHANISM
Filed June 20, 1947        3 Sheets-Sheet 3
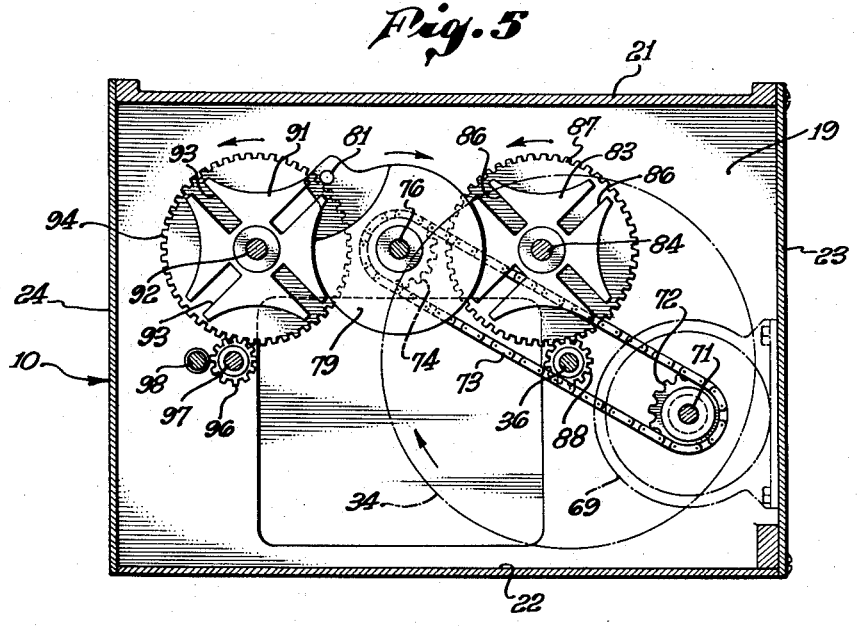
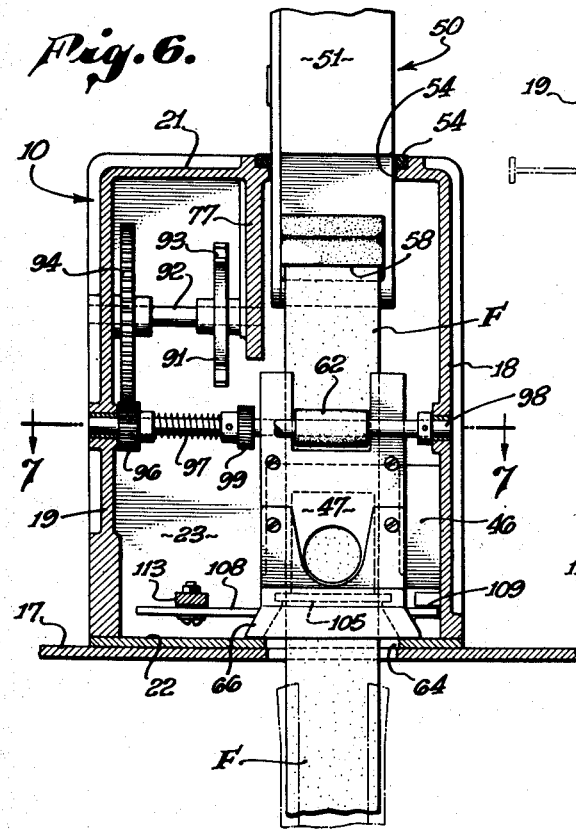
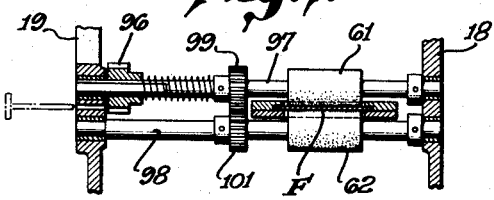
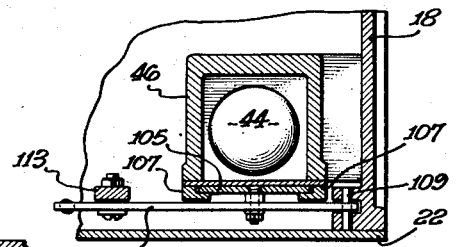
INVENTOR.
Philip S. Allen
BY
ATTORNEY Patented Dec. 19, 1950

2,534,214

UNITED STATES PATENT OFFICE 2,534,214

CAMERA SHUTTER AND FILM ACTUATING MECHANISM

Philip S. Allen, Long Beach, Calif.

Application June 20, 1947, Serial No. 755,849

5 Claims. (Cl. 88—18.3)

The present invention relates to automatic photographic apparatus in general and particularly to a camera unit for incorporation therein. More specifically the invention comprises a self-contained automatic camera unit adapted to expose sequentially a plurality of frames of film.

Fully automatic photographic apparatus of the type in which a person unskilled in the photographic arts can, by the insertion of a coin, take and effect the development of his own picture and have it delivered to himself in a short time period, has become popular and widely used. Such a device is disclosed in my earlier Patent 2,380,378, granted July 31, 1945. This type of apparatus usually employs a predetermined sequence of operations following the insertion of the coin by the operator. Frequently the apparatus is mounted in a small booth in which the operator is provided with a stool or other suitable seat and in which he poses himself for the picture. Upon the insertion of the coin, or the operation of other suitable means, the operation is started, the necessary illuminating lights flash on, the film is exposed, and the picture taken. In certain improved embodiments a plurality of frames of film are exposed serially, an adequate time period being given to the operator to readjust his position if desired between frames, or, if preferred, each picture is taken upon the actuation of a control means, the initial payment entitling the operator to a fixed number of exposures. Following exposure of the final frame the exposed film is taken from the camera proper and, while still within the automatic apparatus, is treated successively in various solutions to effect its development into the final pictures which are then, following a drying operation in some instances, delivered to the operator.

The present invention relates to automatic photographic apparatus of the type described and particularly to a camera unit adapted to be embodied therein. The unit specifically comprises improved means for the sequential advancement of a plurality of frames of film and for its sequential exposure in out-of-phase synchronism with its advancement.

It is an object of the present invention to provide a new and improved automatic camera unit adapted to expose sequentially a plurality of frames upon a unitary strip of film.

A further object of the invention is to provide a new and improved film-actuating and shutter-actuating means in an automatic camera unit.

Still another object of the invention is to provide a new and improved driving means for the film and for the camera shutter to insure their operation in the proper time-phase relationship; and A still further object of the invention is to provide simplified film-and-shutter-actuating mechanism in an automatic camera actuated by a single power source.

These and other more specific objects will appear upon reading the following specification and claims and upon considering in connection therewith the attached drawings to which they relate.

Referring now to the drawings in which a preferred embodiment of the invention is illustrated:

Figure 1 is a section through an automatic photographic apparatus incorporating a camera unit constructed in accordance with the present invention shown positioned therein in top elevation;

Figure 2 is a bottom view of the camera unit illustrated in Figure 1, the bottom wall thereof being removed;

Figure 3 is a vertical section upon the plane 3—3 of Figure 1;

Figure 4 is a transverse horizontal section looking downwardly upon the broken line 4—4 of Figure 3;

Figure 5 is a view in a vertical plane looking in the direction of the arrows upon the broken line 5—5 of Figure 4;

Figure 6 is a section upon the vertical line 6—6 of Figure 3;

Figure 7 is a transverse section upon the line 7—7 of Figure 6 and illustrates roller-propelling means for the film strip;

Figure 8 is a transverse section upon the line 8—8 of Figure 2, through the chamber of the camera proper; and Figure 9 is a top view of the signal light control switch.

The camera unit constructed in accordance with the present invention is adapted to be embodied in an automatic photographic apparatus of the general type disclosed in my earlier Patent 2,380,378. The enclosing case or body of an apparatus of that type is indicated generally in Figure 1 by the reference character 11 and the camera unit comprising the present invention, which forms a part thereof, is indicated generally by the reference character 10. Unit 10 is seen to be positioned in body 11 and specifically behind its front wall 12. The latter includes a pivoted panel 13 provided with a plurality of translucent windows 14 through which are adapted to pass light rays from lamps 16 positioned in the rear thereof.

Camera unit 10 is mounted upon a transverse supporting platform or shelf member 17 and is seen to comprise an enclosing casing having side walls 18 and 19, top and bottom walls 21 and 22, respectively, and end walls 23 and 24, the latter being pivoted at 26 so as to provide an entrance into the interior of the unit. Unit 10 is so located on platform 17 that an aperture 28 in its side wall 18 is positioned in alignment with the small end of a converging light passageway 29 carried by the casing panel 13. Preferably a suitable light seal 32 is provided around the margins of opening 28 in order to prevent admittance of undesired light.

Opening 28 is open at all times but light rays from the exterior through passageway 29 cannot gain admittance to the interior of unit 10 by virtue of the presence of a rotary shutter 34 mounted fixedly upon a rotatable shaft 36 and positioned within a circular recess 39 formed in the side wall 18. The shutter is made of an opaque material such as metal, but is provided with a cut-out arcuate sector 41 positioned as to move past opening 28 upon shutter rotation to admit light. The period of time exposure will, of course, be dependent upon the speed of rotation of shaft 36.

A light conducting tunnel 40 is positioned within the casing of unit 10, its open end in alignment with opening 28 and so with passageway 29. The inner end of tunnel 40 is provided with a reflecting surface 42 which functions to re-direct admitted light rays at right angles through an open side into a lens passageway 43 in which is positioned a lens 44. Beyond lens 44 is a housing or chamber 46 which, adjacent its end wall 47, is provided with upper and lower slots 48 and 49, respectively, adapted to function as guides for the film F which moves therethrough as will be explained.

Film F is carried in roll form within a magazine 50 in which it is rotatably mounted upon a transverse shaft 52. The casing 51 of magazine 50 is provided with transversely extending shoulders 53 which rest upon the marginal edges of a rectangular opening 54 in the unit top wall 21 and are so positioned that a portion of the magazine extends below the wall 21. Preferably a suitable seal 56 is provided around the marginal edge of opening 54 to prevent the entrance of undesired light.

Within unit 10 and directly above the slotted end of chamber 46 magazine 51 is provided with a slot 58, and the film strip extends downwardly therethrough to pass between the propelling rollers 61 and 62 and then through slots 48 and 49. From the latter the film passes downwardly through a discharge port 64, formed in the supporting base 66 of housing 46 and in the wall 22 and adjacent supporting platform 17. Film F is advanced relative to the camera proper, as represented by the interior of housing 46, by the rotation of rollers 61 and 62 as will be described.

According to the present invention shutter 34 and film-propelling rollers 61 and 62 receive their actuating force from a single electrical motor 69, suitably mounted upon end wall 23 and the shaft 71 of which carries a sprocket 72. A continuous chain 73 extends from sprocket 72 to a second sprocket 74 fixed upon a shaft 76 rotatable in bearings in sidewall 19 and in an intermediate longitudinally extending wall 77. A circular disc 79 is also affixed to shaft 76 and carries an axially extended pin 81. Disc 79 and the pin 81 carried thereby make one complete revolution of 360 degrees with each revolution of their carrying shaft 76.

To rotate shutter 34 a Geneva gear 83 is fixedly mounted upon a shaft 84 with its four radially extending slots 86 positioned as to receive sequentially upon rotation the pin 81 of disc 79. Shaft 84, in the manner of shaft 76, is rotatably supported in bearings in sidewall 19 and in intermediate wall 77, and is provided adjacent the former with a fixed gear 87 in mesh with a pinion 88, fixed upon shaft 36 which carries shutter 34. The relationship of disc 79 and its pin 81 to Geneva gear 83 is such that each complete revolution of the disc and pin results in the rotation of Geneva gear 83 and its carrying shaft 84 through an angle of 90 degrees, that is, through a one-quarter revolution. The ratio of gear 87 to pinion 88, however, is such that each one-quarter revolution of the gear effects a complete revolution of 360 degrees of the pinion and so of the shaft 36 and the shutter 34 carried thereby.

To actuate the film-propelling rollers a second Geneva gear 91 is provided positioned upon the diametrically opposite side of shaft 76 from shaft 84. Its shaft 92 is also mounted in the sidewall 19 and the transverse central wall 77, and its radially extending slots 93 are so positioned as to receive the pin 81 carried by disc 79 in the same manner as do the slots 86 of Geneva gear 83. Shaft 92 carries a gear 94 in mesh with a pinion 96 fixed to the same shaft 97 carrying roller 61. Shaft 97 is also rotatably mounted in the sidewalls 18 and 19 of the casing. The second film-propelling roller 62 is fixed to a parallel shaft 98 and the two shafts 97 and 98 are connected for equal speed rotation in opposite directions by a pair of gears 99 and 101.

It is desirable that certain lights illuminate the subject at the time shutter 34 moves as to expose the film and this is accomplished by providing a cam 103 upon the shutter-carrying shaft 36. Cam 103 is positioned as to cooperate with an actuating lever 104 of a switch 106 connected in any suitable manner in the circuit of the lights which may be the lights 16 previously referred to.

It is also desirable, after the predetermined number of frames of films have been exposed, that the film be cut in order that the exposed portion may be treated suitably as to develop it into pictures by means such as those disclosed in my prior patent. To accomplish the cutting operation a knife blade 105 is slidably mounted in a pair of channelled members 107 secured below chamber 46. The edge of blade 105 adjacent discharge port 64 is sharpened and the blade is adapted to move through the normal plane of the film to sever it under the actuation of means which include a lever arm 108 pivoted at 109 adjacent wall 18, and connected by pin 111 to the blade. At its outer end lever 108 is connected to the armature 113 of an electrical solenoid 114. Upon being energized solenoid 114 forces the blade-actuating lever 108 and the blade 105 from their full line positions illustrated in Figure 2 to their dotted line positions as illustrated in the same figure to accomplish cutting operation. The de-energizing of the solenoid enables a connected coil spring 116 to return the lever 108 and the blade 105 to their initial inoperative positions.

An added feature which has been found to be desirable is the provision of means which indicate to the operator the time periods at which he should rearrange himself for the next picture. These indications may be given by the flashing of suitable lights, the meaning of which he has been informed by a suitable set of instructions. The exact location of these indicating lights is not of the essence, but their operation can be controlled by connecting them as by leads 121 to stationary contacts 122, mounted as to be contacted by a movable contact 123 carried by shaft 84. Assuming that four pictures comprise a complete cycle, four of such stationary contacts 122 would be provided to be contacted sequentially, and in a fixed order by the rotatable contact 123 which rotates with shaft 84, one for each four rotations of the shutter 34 coinciding with four advances of the film F.

The operation of the unit constructed in accordance with the present invention is believed to be clear from the foregoing. The operator positions himself before a unit constructed as disclosed in my earlier Patent 2,380,378 and deposits his coin in the provided slot. Under the control of a distributor controlling the operation of the entire device, including the camera unit to which the present invention particularly relates, the unit motor 69 will be energized. Depending upon the time relationship desired, the energization of motor 69 can be continuous or discontinuous. Its rotation, however, effects the rotation of the pin-carrying disc 79 as described. Each rotation of disc 79 in turn effects a quarter turn of Geneva gears 83 and 91 connected, respectively, to the shutter and to the film propelling means. Assuming disc 79 to be positioned initially as illustrated in Figure 5, its rotation in the direction of the arrow would effect first the quarter turn of Geneva gear 83 and its connected shaft 84. Pin 81 would enter the awaiting slot 86 of Geneva gear 83, whereupon that gear would be rotated a quarter turn, resulting as described, in the complete rotation of shutter 34. During the movement of slot 41 of shutter 34 past the open end of tunnel 40 light rays carrying the image of the operator would be conveyed to the film F, being deflected by the mirror surface 42 through the lens 44. The passage of the shutter opening 41 beyond the tunnel 40 precludes the further entrance of light rays into the camera proper. The continued rotation of disc 79 carries pin 81 from the slot of Geneva gear 83 into engagement with an awaiting slot 93 of Geneva gear 91 to effect a quarter turn thereof by its return to its initial position. This quarter turn of Geneva gear 91 causes, through the described connections, the downward advance of film F by the concurrent action of rollers 61 and 62, the roll of films within magazine 51 turning upon shaft 52 to permit of the film movement. During this movement of the film the shutter 34 prevents the entrance of light into the camera proper and the interior of unit 11 is at all times maintained in darkness or semi-darkness.

The continued or subsequent rotation of the disc 79 effects the repeated sequential rotations of Geneva gears 83 and 91 and so the sequential operations of the shutter and of the film-moving means. Assuming that four pictures comprise a complete cycle, the mechanism illustrated in Figure 5 will be returned, following the taking of the fourth picture, and its projection through the discharge port 64, to the relationship as illustrated. Thereafter, and under the control of any suitable means which could comprise a distributor, the knife 106 would be actuated by the solenoid 114 and the film F cut immediately below chamber 46, whereupon the exposed film would be removed automatically and subjected to a series of steps to produce the completed pictures.

While the particular apparatus herein shown and described in detail is fully capable of attaining the objects and providing the advantages hereinbefore stated, it is to be understood that it is but illustrative of the presently preferred embodiments of the invention, and that it is not intended to limit the scope of the invention to the details of construction or design herein disclosed, other than as set forth in the appended claims.

I claim:

1. In an automatic photographic apparatus for taking a series of pictures in a sequence on a sensitized strip of film of the type including film-exposing means comprising a passageway for image-carrying light rays and a rotatable shutter to intercept said rays, film-supplying means comprising a film magazine, guides to direct said film into position to intercept said rays, and roller-propelling means for said film; means to actuate said shutter and said propelling means sequentially comprising a driving motor, a shaft rotated by said motor, a pair of Geneva gears spaced arcuately around said shaft, means carried by said shaft to actuate said gears sequentially through an arc of rotation less than 360 degrees, a first and second gear rotatable with said Geneva gears, a first pinion engaging said first gear and rotatable through an arc of 360 degrees upon its rotation through said lesser arc, a second pinion engaging said second gear, said shutter being directly connected to said first pinion for rotation therewith and said propelling means being connected to said second pinion for operation thereby.

2. The structure recited by claim 1 characterized in that said propelling means includes a roller and in that its circumferential travel under the actuation of said second pinion effects a displacement of film through said passageway equal to the size of picture to be taken.

3. The structure recited by claim 1 characterized in that said propelling means comprises a pair of film-engaging rollers positioned between said magazine and said passageway and sufficiently close to the latter as to push the said film therein and therethrough, said rollers being connected to said second pinion for rotation therewith and having a diameter such that their circumferential travel upon the rotation of said second pinion is sufficient to displace a full picture frame through said passageway.

4. In an automatic photographic apparatus for taking a series of pictures in a sequence on a sensitized strip of film of the type including film-exposing means comprising a passageway for image-carrying light rays and a rotatable shutter to intercept said rays, film-supplying means comprising a film magazine, guides to direct said film into position to intercept said rays, and roller-propelling means for said film; means to actuate said shutter and said propelling means sequentially comprising a driving motor, a driven shaft, means including a chain and sprockets connecting said driven shaft to said motor, a disc fixed to said driven shaft, an axially extended pin fixed to said disc, a pair of shafts extended parallel to said driven shaft, a Geneva gear fixed to each of said shafts and positioned as to be engaged by said pin upon the rotation of said driven shaft and to effect the rotation of their connected shafts through an arc of 90 degrees upon each such engagement, means including gears connecting one of said Geneva gears to said shutter, said gear having a ratio such that said shutter is rotated through 360 degrees upon each 90 degree rotation of the connected Geneva gear, and means including gear means connecting the other of said Geneva gears to said propelling means.

5. In an automatic photographic apparatus for taking a series of pictures in a sequence on a sensitized strip of film of the type including film-exposing means comprising a passageway for image-carrying light rays and a rotatable shutter to intercept said rays, film-supplying means comprising a film magazine, guides to direct said film into position to intercept said rays, and roller-propelling means for said film; means to actuate said shutter and said propelling means sequentially comprising a driving motor, a driven shaft, means including a chain and sprockets connecting said driven shaft to said motor, a disc fixed to said driven shaft, an axially extended pin fixed to said disc, a pair of shafts extended parallel to said driven shaft, a Geneva gear fixed to each of said shafts and positioned as to be engaged by said pin upon the rotation of said driven shaft and to effect the rotation of their connected shafts through an arc of 90 degrees upon each such engagement, means including gears connecting one of said Geneva gears to said roller-propelling means, the ratio of said gears and the diameter of said roller-propelling means being related as to effect the advance of a single picture frame through said passageway upon the rotation of said one Geneva gear through 90 degrees, and means to rotate said shutter through 360 degrees upon the rotation of the other of said Geneva gears.

PHILIP S. ALLEN.

REFERENCES CITED

The following references are of record in the file of this patent:

UNITED STATES PATENTS

| Number | Name | Date |
|---|---|---|
| 601,951 | Davis | Apr. 5, 1898 |
| 1,262,255 | Rector | Apr. 9, 1918 |
| 1,332,700 | Wheeler | Mar. 2, 1920 |
| 1,662,057 | Hadley | Mar. 13, 1928 |
| 1,846,571 | Rochestie et al. | Feb. 23, 1932 |
| 1,911,345 | Bodan et al. | May 30, 1933 |
| 2,009,053 | Mayer | July 23, 1935 |

FOREIGN PATENTS

| Number | Country | Date |
|---|---|---|
| 231,675 | Germany | Feb. 25, 1911 |
| 820,096 | France | July 19, 1937 |